(12) United States Patent
Carlson et al.

(10) Patent No.: US 12,529,860 B2
(45) Date of Patent: Jan. 20, 2026

(54) BREAKOUT CABLE ASSEMBLY

(71) Applicant: The Siemon Company, Watertown, CT (US)

(72) Inventors: Robert S. Carlson, Weatogue, CT (US); John Corsi, Sandy Hook, CT (US)

(73) Assignee: THE SIEMON COMPANY, Watertown, CT (US)

( * ) Notice: Subject to any disclaimer, the term of this patent is extended or adjusted under 35 U.S.C. 154(b) by 283 days.

(21) Appl. No.: 18/310,156

(22) Filed: May 1, 2023

(65) Prior Publication Data
US 2023/0358984 A1    Nov. 9, 2023

Related U.S. Application Data

(60) Provisional application No. 63/337,695, filed on May 3, 2022.

(51) Int. Cl.
*G02B 6/00*    (2006.01)
*G02B 6/44*    (2006.01)

(52) U.S. Cl.
CPC ..... *G02B 6/44528* (2023.05); *G02B 6/44524* (2023.05)

(58) Field of Classification Search
CPC ............ G02B 6/44528; G02B 6/44524; G02B 6/3825; G02B 6/3885; G02B 6/00
See application file for complete search history.

(56) References Cited

U.S. PATENT DOCUMENTS

| | | |
|---|---|---|
| 7,519,258 B2 | 4/2009 | Wilken et al. |
| 8,842,954 B2 | 9/2014 | Burris et al. |
| 8,948,557 B2 | 2/2015 | Islam |
| 9,989,705 B2* | 6/2018 | Jensen ............... G02B 6/44715 |
| 10,830,965 B2 | 11/2020 | Leblanc et al. |
| 2012/0093465 A1* | 4/2012 | Danley ............... G02B 6/3885 385/59 |
| 2023/0116864 A1 | 4/2023 | Tunks et al. |

* cited by examiner

*Primary Examiner* — Jennifer Doan
(74) *Attorney, Agent, or Firm* — CANTOR COLBURN LLP (57) ABSTRACT

A breakout cable assembly includes a first connector; a plurality of cable legs terminated at the first connector, each cable leg including two or more optical fibers; an intermediate connector in each cable leg, each intermediate connector dividing a respective cable leg into a first cable segment and a second cable segment; a plurality of second connecters, each second connector terminated to a respective second cable segment.

15 Claims, 7 Drawing Sheets

BREAKOUT CABLE ASSEMBLY

CROSS REFERENCE TO RELATED APPLICATIONS

This application claims the benefit of U.S. provisional patent application No. 63/337,695, filed May 3, 2022, the entire content of which is incorporated herein by reference.

BACKGROUND

The embodiments described herein relate to cable assemblies, and more particularly to a breakout cable assembly having a plurality of cable legs, each leg independently serviceable.

Breakout cable assemblies are used to connect equipment, such as network switches and servers. Existing breakout cable assemblies include a first connector, a plurality cable legs and a second connector at an end of each of the plurality of cable legs. An example breakout cable assembly is offered by The Siemon Company, referred to as an active optical cable 100G QSFP28 to 4×SFP28 breakout. One issue with existing breakout cable assemblies is when one cable leg experiences a fault (for example, in the cable or the second connector), then the entire breakout cable assembly must be replaced. This disrupts service to all equipment connected to the second connectors.

SUMMARY

According to an embodiment, a breakout cable assembly includes a first connector; a plurality of cable legs terminated at the first connector, each cable leg including two or more optical fibers; an intermediate connector in each cable leg, each intermediate connector dividing a respective cable leg into a first cable segment and a second cable segment; a plurality of second connecters, each second connector terminated to a respective second cable segment.

In addition to one or more of the features described herein, or as an alternative, further embodiments may include wherein the intermediate connector in each cable leg includes a third connector, a fourth connector and an adapter.

In addition to one or more of the features described herein, or as an alternative, further embodiments may include wherein the third connector and the fourth connector are LC connectors.

In addition to one or more of the features described herein, or as an alternative, further embodiments may include wherein the intermediate connector in each cable leg includes an MPO connector.

In addition to one or more of the features described herein, or as an alternative, further embodiments may include wherein a length of each second cable segment corresponds to a distance between a wire management and second equipment in a rack.

In addition to one or more of the features described herein, or as an alternative, further embodiments may include wherein a length of each second cable segment corresponds to a distance between a wire management and second equipment in multiple racks.

In addition to one or more of the features described herein, or as an alternative, further embodiments may include a second intermediate connector in each first cable segment, each second intermediate connector dividing a respective first cable segment into a first section and a second section.

In addition to one or more of the features described herein, or as an alternative, further embodiments may include wherein the second intermediate connector in each first cable segment includes a fifth connector, a sixth connector and an adapter.

In addition to one or more of the features described herein, or as an alternative, further embodiments may include wherein the fifth connector and the sixth connector are LC connectors.

In addition to one or more of the features described herein, or as an alternative, further embodiments may include wherein the second intermediate connector in each first cable segment includes an MPO connector.

In addition to one or more of the features described herein, or as an alternative, further embodiments may include wherein a length of each first section corresponds to a distance between a wire management are and second equipment in a rack.

In addition to one or more of the features described herein, or as an alternative, further embodiments may include a splitter configured to divide an output of the first connector the first cable segments.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1A:
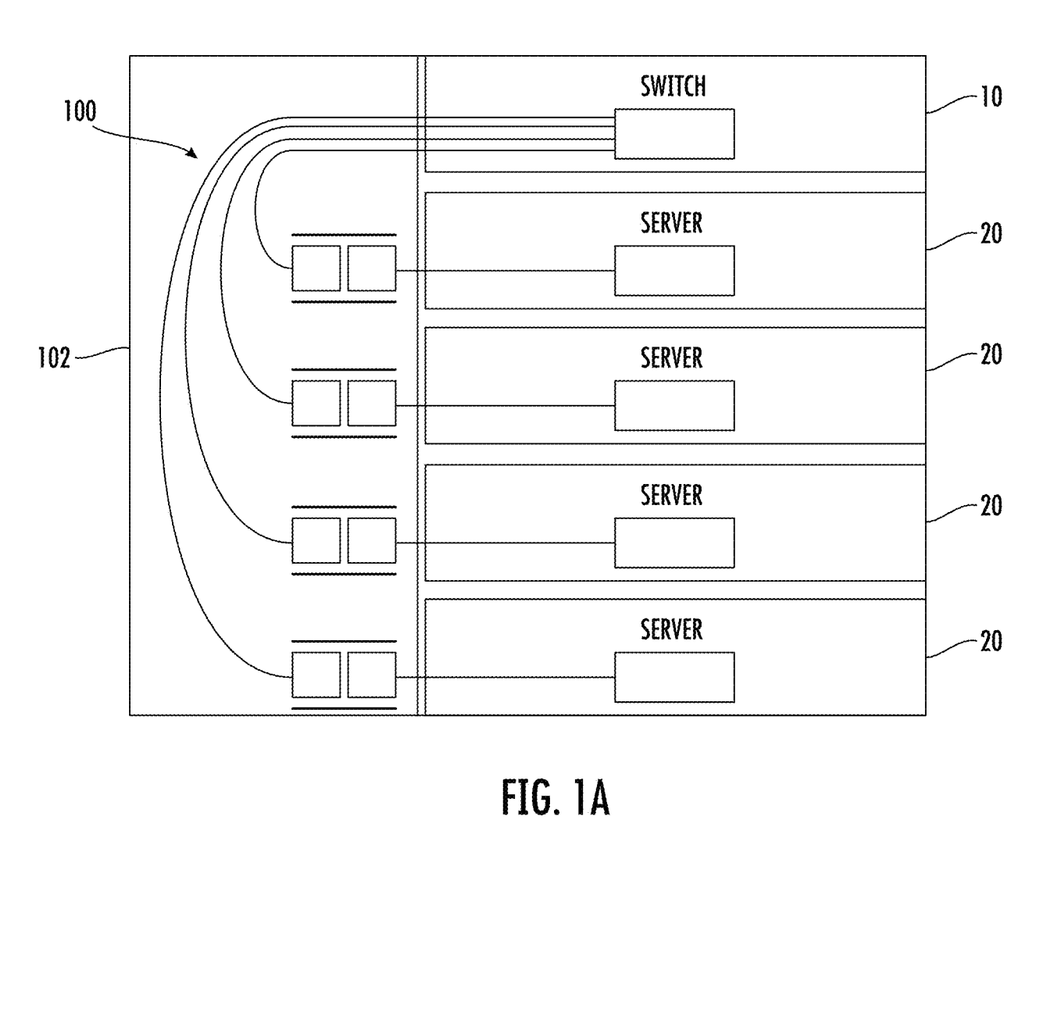
FIGS. 1A and 1B depict environments for employing a breakout cable assembly in an example embodiment.
Figure 1B:
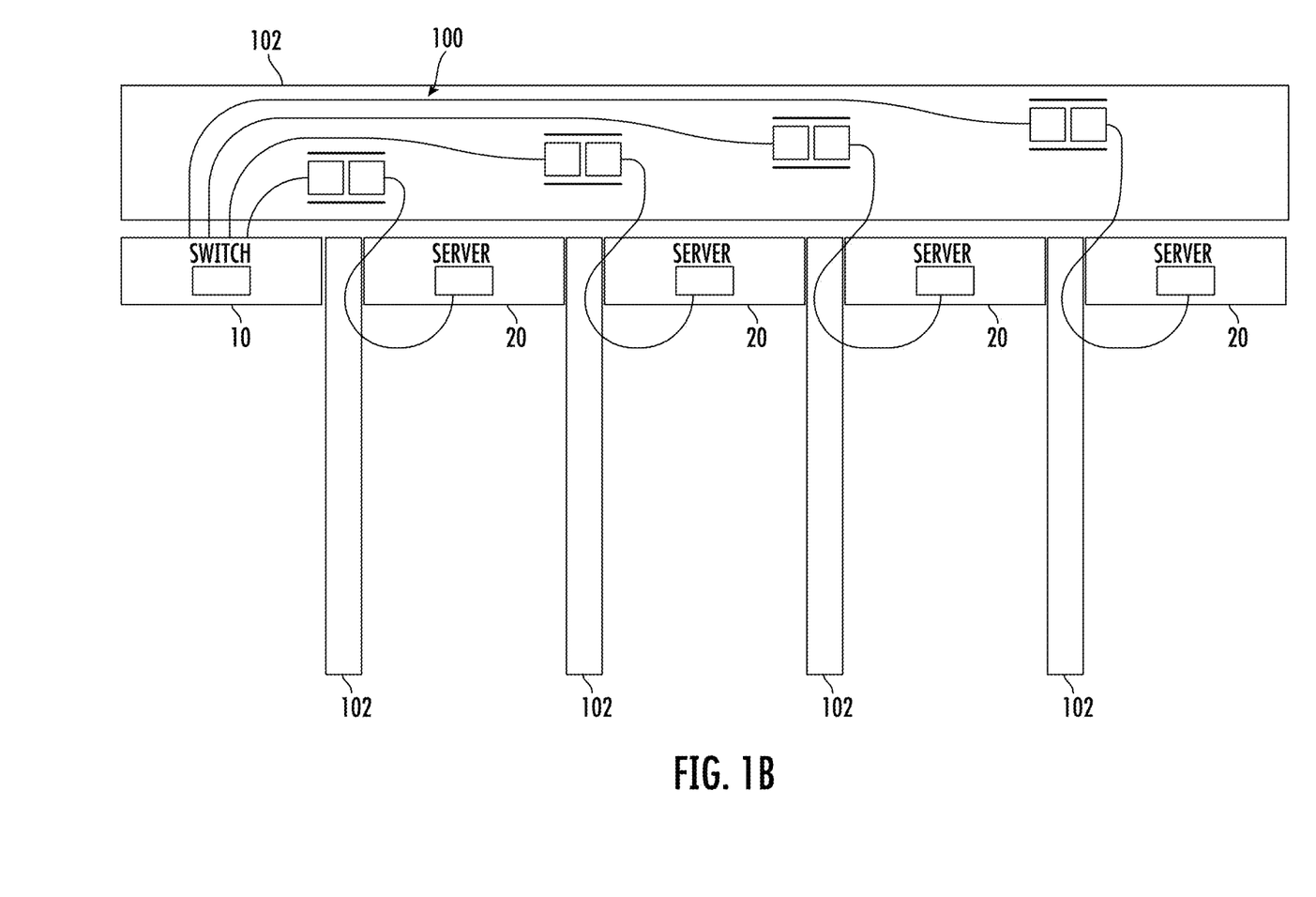

FIGS. 1A and 1B depict an environment for employing a breakout cable assembly in an example embodiments. In FIG. 1A, a breakout cable assembly 100 is used to connect first equipment 10 to a plurality of second equipment 20, located at various heights in an equipment rack. In FIG. 1B, the second equipment 20 is located in separate racks. In the example in FIGS. 1A and 1B, the first equipment is a network switch 10 and the second equipment includes servers 20. It is understood that a variety of types of equipment may be used with the breakout cable assembly 100, and embodiments are not limited to the equipment depicted in FIGS. 1A and 1B. The breakout cable assembly 100 is connected to the first equipment 10, passes through a cable management area 102 and then is connected to each second equipment 20. The distance between the cable management area 102 and each second equipment may be, for example but not limited to, 0.5 meters.

Figure 2:
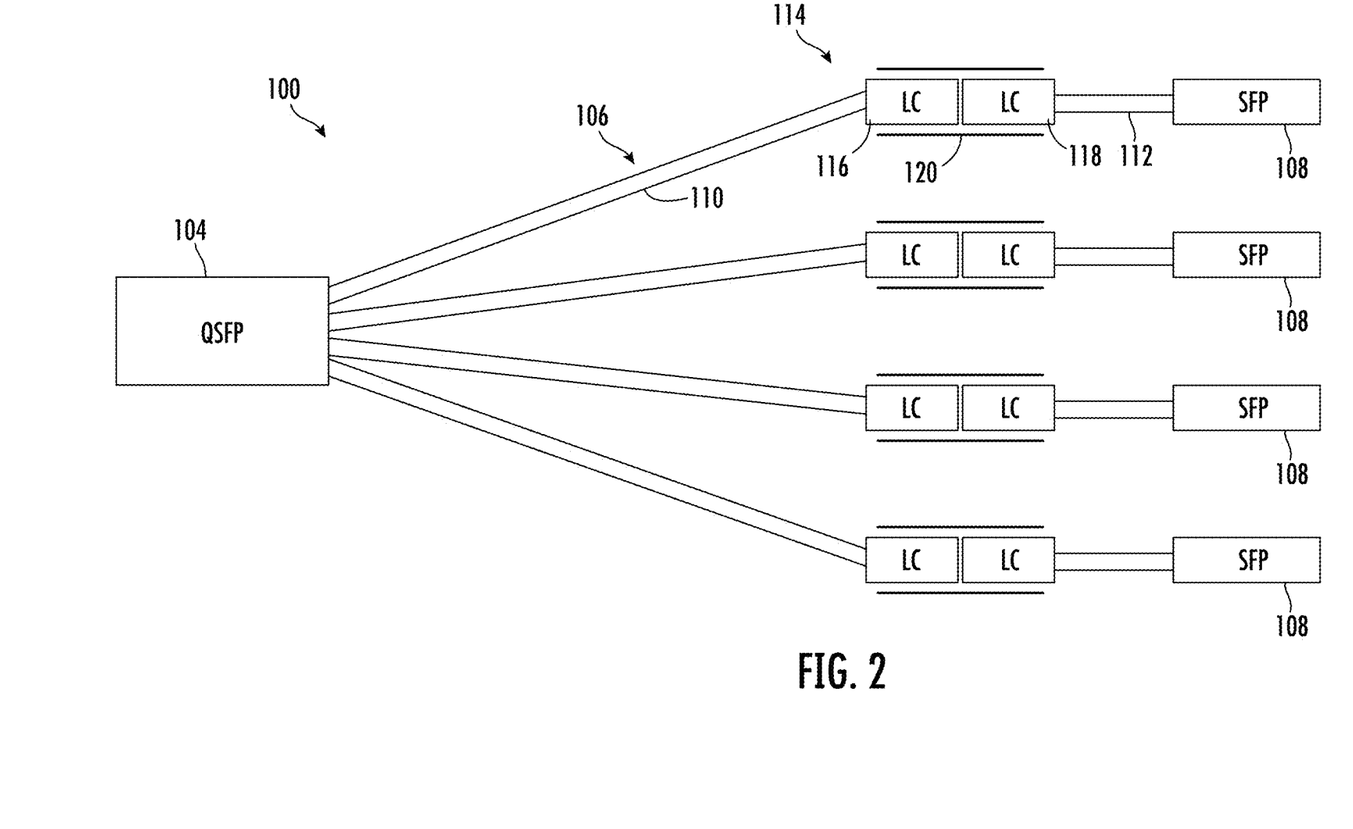
FIG. 2 depicts a breakout cable assembly in an example embodiment.

FIG. 2 depicts a breakout cable assembly 100 in an example embodiment. A first connector 104 is used to connect to the first equipment 10. In the example in FIG. 2, the first connector 104 is a QSFP connector. It is understood that other types of connectors may be used as the first connector 104. Exiting the first connector 104 are four cable legs 106. The cable legs 106 include optical fiber. The cable legs 106 extend from the first connector 104 to the second connector 108. Each cable leg 106 includes two or more optical fibers, defining send and receive channels for the first connector 104. In the example in FIG. 2, the second connector 108 is a SFP connector. It is understood that other types of connectors may be used as the second connector 104.

Each cable leg 106 includes a first cable segment 110 and a second cable segment 112, connected by an intermediate connector 114. The first cable segment 110 is terminated at the first connector 104 and the intermediate connector 114. The second cable segment 112 is terminated at the intermediate connector 114 and the second connector 108. In the example of FIG. 2, the intermediate connector 114 includes a third connector 116 terminated on the first cable segment 110 and a fourth connector 118 terminated on the second cable segment 112. In the example in FIG. 2, the third connector 116 and the fourth connector 118 are LC connectors, mated through an adapter 120. It is understood that the intermediate connector 114 may be implemented in other manners, such as a plug and outlet and is not limited to LC connectors. In example embodiments, the third connector 116 and the fourth connector 118 are multi-fiber push on (MPO) connectors.

The length of the second cable segment 112 may be equal to the distance between the cable management area 102 and the second equipment 20 (e.g., 0.5 meters). The length of the first cable segment 110 may be variable, depending on the location (e.g. height) of the second equipment 20 in the equipment rack.

The intermediate connector 114 allows for disconnection of a faulty or damaged second cable segment 112 and/or faulty or damaged second connecter 108, without disconnecting any other second cable segments 112. This reduces service interruptions on second equipment 20.

Figure 3:
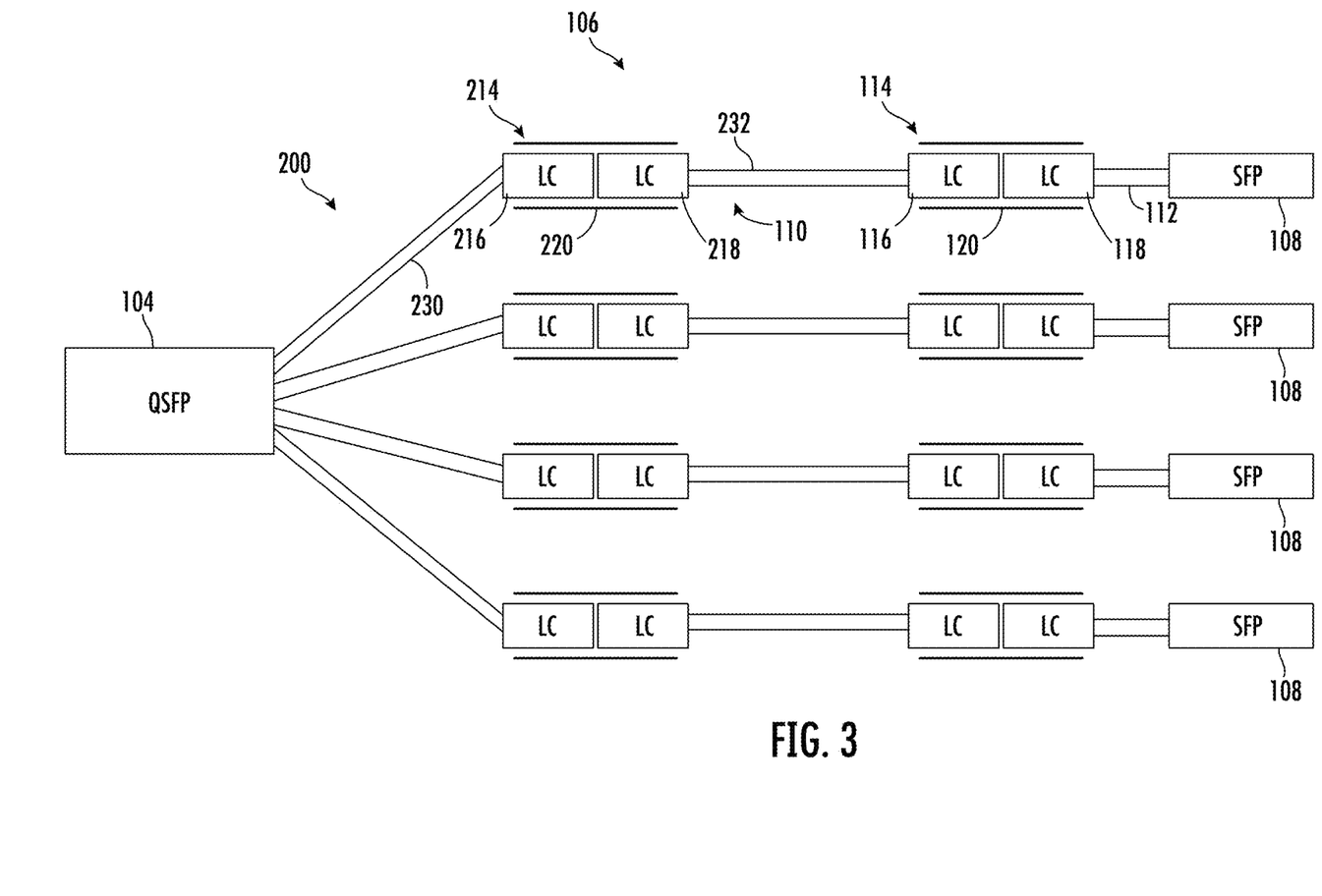
FIG. 3 depicts a breakout cable assembly in an example embodiment.

FIG. 3 depicts a breakout cable assembly 200 in an example embodiment. In FIG. 3, the intermediate connector 114 and second cable segment 112 are similar to those in FIG. 2. The first cable segment 110 is divided into a first section 230 and a second 232 by a second intermediate connecter 214. The first section 230 is terminated at the first connector 104 and the second intermediate connector 214. The second section 232 is terminated at the second intermediate connector 214 and the intermediate connecter 114. The second cable segment 112 is terminated at the intermediate connector 114 and the second connector 108. In the example of FIG. 3, the second intermediate connector 214 includes a fifth connector 216 terminated on the first section 230 and a sixth connector 218 terminated on the second section 232. In the example in FIG. 3, the fifth connector 216 and the sixth connector 218 are LC connectors, mated through an adapter 220. It is understood that the second intermediate connector 214 may be implemented in other manners, such as a plug and outlet. In example embodiments, the fifth connector 216 and the sixth connector 218 are multi-fiber push on (MPO) connectors.

In FIG. 3, the length of the first section 230 of the first cable segment 110 may be equal to the distance between the cable management area 102 and the second equipment 20 (e.g., 0.5 meters). The length of the second section 232 of the first cable segment 110 may be variable, depending on the location (e.g. height) of the second equipment 20 in the equipment rack.

Figure 4:
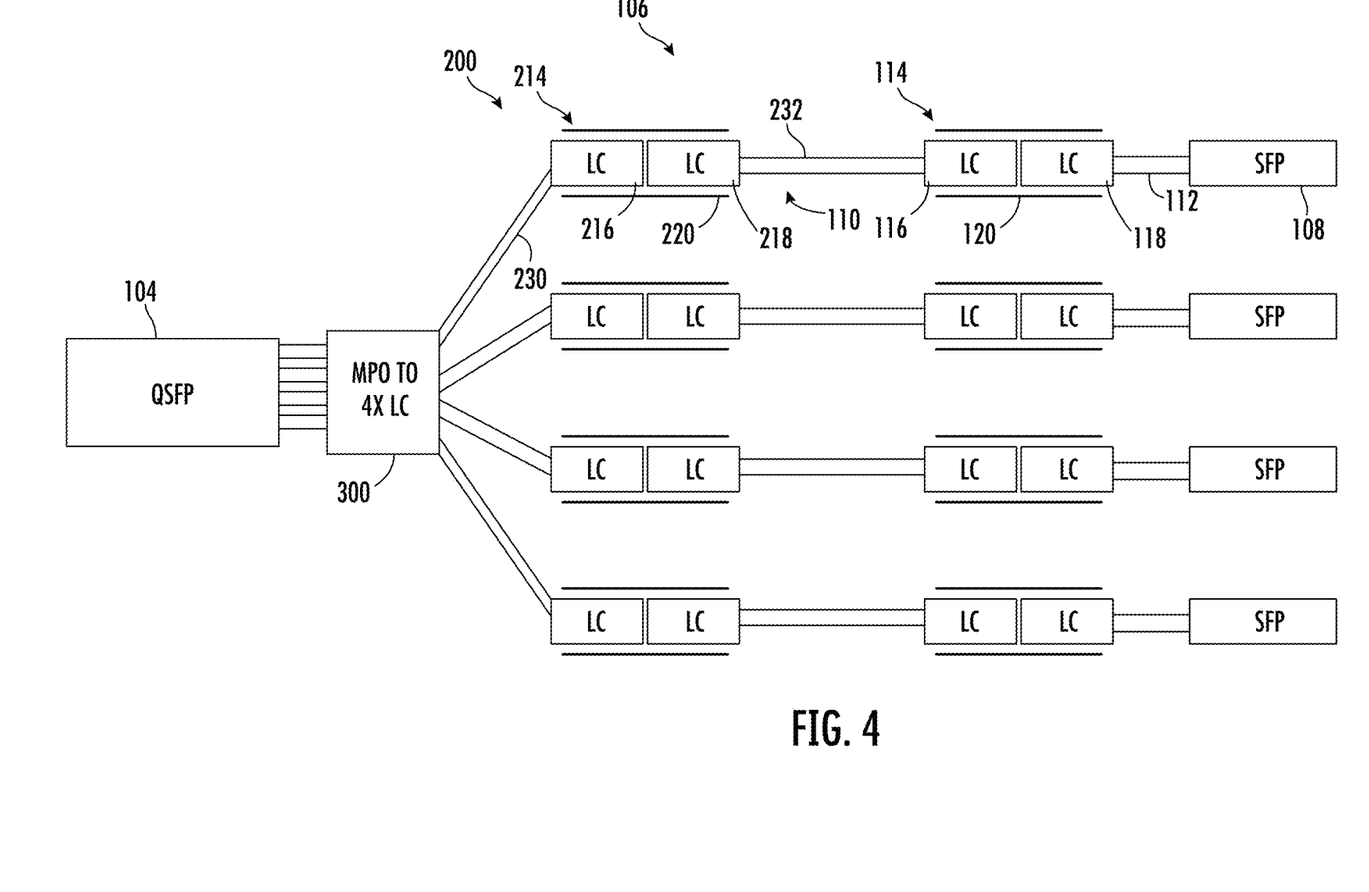
FIG. 4 depicts a breakout cable assembly in an example embodiment.

FIG. 4 depicts a breakout cable assembly in an example embodiment. The embodiment of FIG. 4 is similar to that in FIG. 3. One difference in FIG. 4 is the use of a splitter 300 at an output of the first connecter 104. The splitter 300 is terminated to the output (e.g., fibers) of connector 104. The splitter 300 divides the output of the first connector 104 into the four first sections 230 of the first cable segments 110. As shown in FIG. 4, the splitter is an multi-fiber push on (MPO) to LC splitter. It is understood that the splitter 300 may interface with various connector configurations, and embodiments are not limited to MPO to LC. The splitter 300 may also be used in the embodiment of FIG. 2, at the output of first connecter 104.

Figure 5:
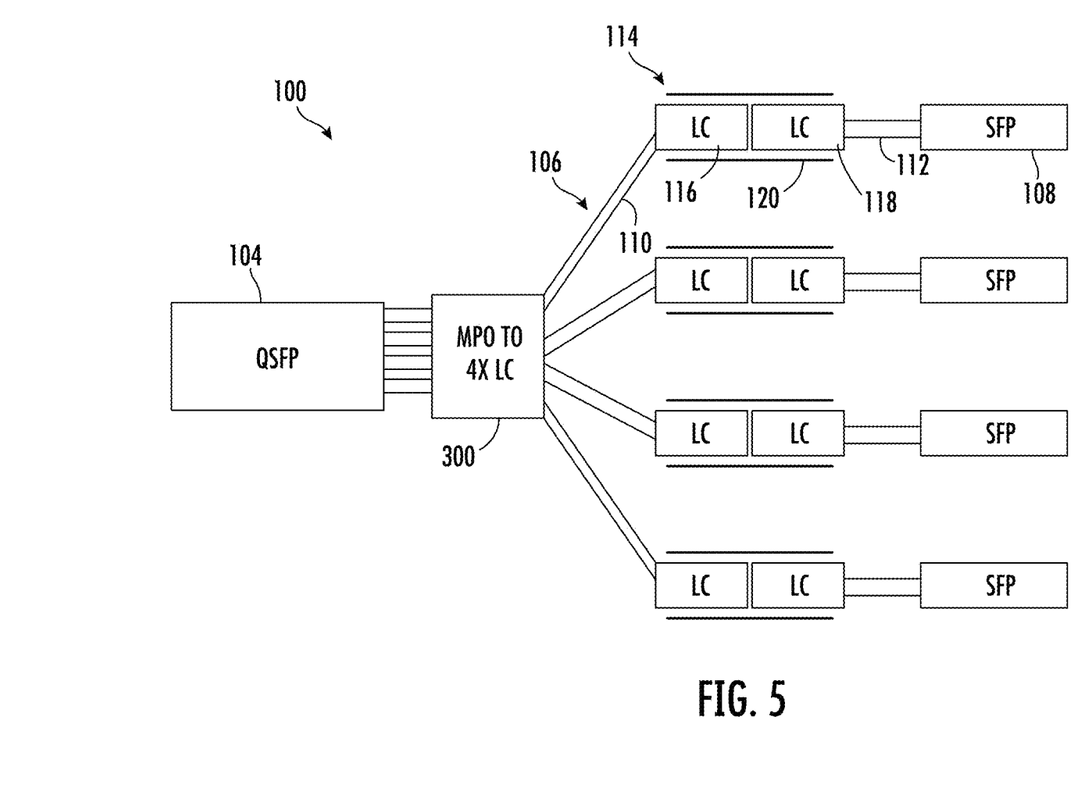
FIG. 5 depicts a breakout cable assembly in an example embodiment.

FIG. 5 depicts a breakout cable assembly in an example embodiment. In FIG. 5, the splitter 300 of FIG. 4 is used with the cable legs 106 of FIG. 2.

Figure 6:
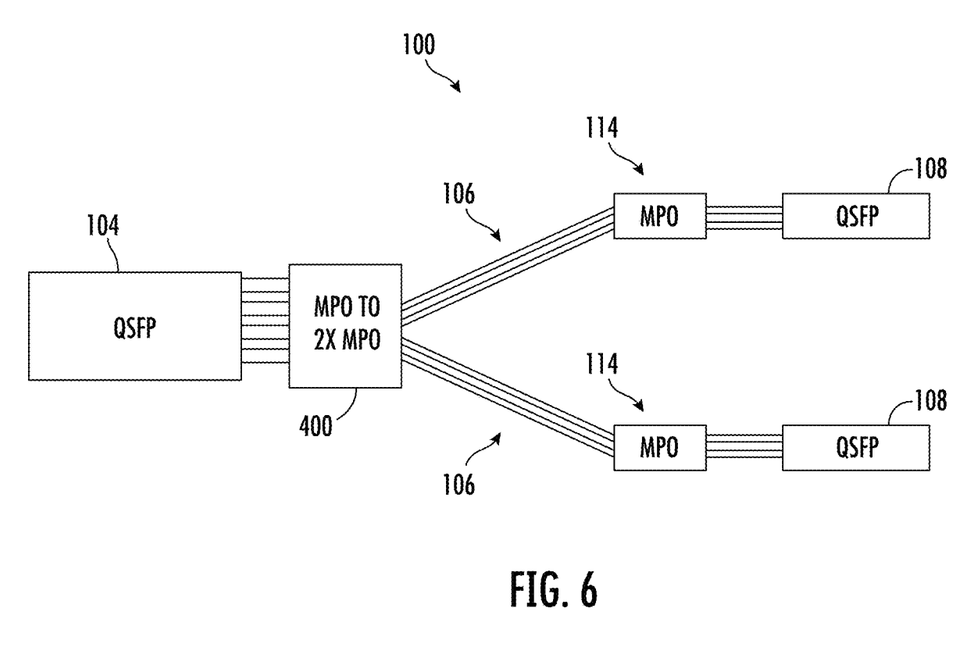
FIG. 6 depicts a breakout cable assembly in an example embodiment.

FIG. 6 depicts a breakout cable assembly in an example embodiment. In FIG. 6, a splitter 400 is connected to the first connector 104. The splitter 400 is terminated to the output (e.g., fibers) of connector 104. The splitter 400 divides an MPO output of the first connector 104 into at least two MPO cable legs 106. The intermediate connectors 114 are implemented using MPO connectors.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A breakout cable assembly comprising
   a first connector;
   a plurality of cable legs terminated at the first connector, each cable leg including two or more optical fibers;
   a first intermediate connector in each cable leg, each first intermediate connector dividing a respective cable leg into a first cable segment and a second cable segment;
   a plurality of second connecters, each second connector terminated to a respective second cable segment.

2. The breakout cable assembly of claim 1, wherein the first intermediate connector in each cable leg includes a third connector, a fourth connector and an adapter.

3. The breakout cable assembly of claim 2, wherein the third connector and the fourth connector are LC connectors.

4. The breakout cable assembly of claim 1, wherein the first intermediate connector in each cable leg includes an MPO connector.

5. The breakout cable assembly of claim 1, wherein a length of each second cable segment corresponds to a distance between a wire management and second equipment in a rack.

6. The breakout cable assembly of claim 1, wherein a length of each second cable segment corresponds to a distance between a wire management and second equipment in multiple racks.

7. The breakout cable assembly of claim 1, further comprising:
    a second intermediate connector in each first cable segment, each second intermediate connector dividing a respective first cable segment into a first section and a second section.

8. The breakout cable assembly of claim 7, wherein the second intermediate connector in each first cable segment includes a fifth connector, a sixth connector and an adapter.

9. The breakout cable assembly of claim 8, wherein the fifth connector and the sixth connector are LC connectors.

10. The breakout cable assembly of claim 7, wherein the second intermediate connector in each first cable segment includes an MPO connector.

11. The breakout cable assembly of claim 7, wherein a length of each first section corresponds to a distance between a wire management are and second equipment in a rack.

12. The breakout cable assembly of claim 1, further comprising:
    a splitter configured to divide an output of the first connector the first cable segments.

13. The breakout cable assembly of claim 12, wherein the splitter comprises a multi-fiber push on (MPO) to LC splitter.

14. The breakout cable assembly of claim 1, wherein the first connector comprises a quad small form factor pluggable (QSFP) connector.

15. The breakout cable assembly of claim 1, wherein at least one of the second connectors comprises a small form-factor pluggable (SFP) connector.

\* \* \* \* \*